(12) United States Patent
Hu et al.

(10) Patent No.: US 9,947,371 B1
(45) Date of Patent: Apr. 17, 2018

(54) COMPACT TOOL-LESS HDD CARRIER

(71) Applicant: QUANTA COMPUTER INC., Taoyuan (TW)

(72) Inventors: Te-Hao Hu, Taoyuan (TW);
Yaw-Tzorng Tsorng, Taoyuan (TW);
Chun Chang, Taoyuan (TW);
Chao-Jung Chen, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 0 days.

(21) Appl. No.: 15/412,979

(22) Filed: Jan. 23, 2017

(51) Int. Cl.
| G11B 33/12 | (2006.01) |
| G11B 33/00 | (2006.01) |
| G11B 33/02 | (2006.01) |
| G11B 33/06 | (2006.01) |
| G06F 1/18 | (2006.01) |

(52) U.S. Cl.
CPC ............ *G11B 33/128* (2013.01); *G06F 1/187* (2013.01); *G11B 33/005* (2013.01); *G11B 33/022* (2013.01); *G11B 33/06* (2013.01); *G11B 33/126* (2013.01)

(58) Field of Classification Search
CPC combination set(s) only.
See application file for complete search history.

(56) References Cited

U.S. PATENT DOCUMENTS

| 4,426,122 A * | 1/1984 | Lainez ................. A62B 18/082 |
| | | 361/679.55 |
| 6,171,120 B1 * | 1/2001 | Bolich ............. H01R 13/62933 |
| | | 361/679.4 |
| 6,490,153 B1 * | 12/2002 | Casebolt ................. G06F 1/184 |
| | | 361/679.33 |
| 6,774,808 B1 * | 8/2004 | Hibbs ..................... G06F 1/184 |
| | | 340/686.4 |

(Continued)

FOREIGN PATENT DOCUMENTS

| TW | M303460 U | 12/2006 |
| TW | M334431 U | 6/2008 |
| TW | 201606763 A | 2/2016 |

OTHER PUBLICATIONS

Taiwanese Office Action for Application No. 106108891, dated Aug. 28, 2017, w/ First Office Action Summary.

(Continued)

*Primary Examiner* — Lisa Lea Edmonds
(74) *Attorney, Agent, or Firm* — Nixon Peabody LLP; Eduardo J. Quinones; Zhou Lu

(57) ABSTRACT

A computing device with a drive slot having an ear with a vertical receiving groove, a connector for engaging a corresponding connector of a hard disk drive (HDD), and a horizontal track with a pin insertion portion and a pin retaining portion. The computing device also includes a removable a HDD carrier for insertion into the drive slot having a bracket for securing the HDD and a track pin extending therefrom and configured to be inserted into the (Continued)

horizontal track via the pin insertion portion and configured to restrict the removable HDD carrier to horizontal motion when the track pin engages with the pin retaining portion. The HDD carrier includes a handle pivotably attached to the bracket with a guide pin for inserting into the vertical receiving groove and configured to alternate between a loading position and a locked position.

12 Claims, 10 Drawing Sheets

(56) References Cited

U.S. PATENT DOCUMENTS

| | | | |
|---|---|---|---|
| 7,408,788 B2* | 8/2008 | Rubenstein | H05K 7/1409 361/754 |
| 7,417,866 B1* | 8/2008 | Beseth | H05K 7/1409 361/728 |
| 8,369,080 B2* | 2/2013 | Huang | G06F 1/187 361/679.37 |
| 2006/0171110 A1 | 8/2006 | Li | |
| 2008/0013288 A1* | 1/2008 | Karstens | H05K 7/1409 361/726 |
| 2010/0134987 A1* | 6/2010 | Furholzer | H02B 1/052 361/747 |
| 2013/0099640 A1* | 4/2013 | Hu | G06F 1/187 312/223.2 |
| 2014/0209548 A1 | 7/2014 | Lo et al. | |
| 2014/0233182 A1* | 8/2014 | Demange | H05K 7/1409 361/679.58 |
| 2015/0192970 A1 | 7/2015 | Jau et al. | |
| 2015/0201520 A1 | 7/2015 | Jau et al. | |
| 2015/0327414 A1* | 11/2015 | Jau | H05K 13/0084 206/701 |
| 2016/0042768 A1* | 2/2016 | Yang | G11B 33/128 403/322.4 |

OTHER PUBLICATIONS

Extended European Search Report for EP Application No. 17179651.9, dated Jan. 17 2018.

* cited by examiner

COMPACT TOOL-LESS HDD CARRIER

FIELD OF THE INVENTION

The present invention relates to hard drive disk carriers, and more specifically to compact and tool-less hard drive disk carriers.

BACKGROUND

Hard disk drives (HDDs) are commonly utilized to store relatively large amounts of data in today's computer systems. HDDs are especially useful in situations where a user may need to access a relatively large amount of data reasonably quickly, for example, as compared with accessing an archived tape copy. This use is becoming even more commonplace as HDDs become increasingly cheaper while providing a larger storage capacity. Moreover, as the new technologies such as video capturing and digital image storage become more commonplace, large capacity HDDs become an ever more important part of a computer system.

Removing a HDD from many types of computer systems today requires tools and involves pulling cables from cable sockets. Over time, or through incorrect usage, these cables or sockets become frail and can introduce data transfer errors associated with the HDD in use. Installing a HDD is not any easier because it involves similar hardships.

Furthermore, a computer data center (also referred to as an Internet data center or an enterprise data center) may contain a myriad of computer systems utilizing various HDDs. The large number of high-capacity HDDs in a data center poses significant problems associated with their removal and installation. The time and skills involved in removing or installing HDDs in a data center can become burdensome.

Accordingly, it is becoming extremely important for various reasons (such as data backup and generally switching HDDs) to be able to easily, quickly, and efficiently remove and install a HDD in a computer system.

SUMMARY

Embodiments of the invention concern compact and tool-less hard drive disk carriers. A computing device according to the various embodiments can include an enclosure with at least one drive slot, the at least one drive slot including at least one ear with a vertical receiving groove, at least one connector for engaging a corresponding connector of a hard disk drive, and at least one horizontal track with a pin insertion portion and a pin retaining portion. The computing device also includes a hard drive carrier for removable insertion into the at least one drive slot.

The hard drive carrier includes a bracket for securing the hard disk drive and having at least one pin extending therefrom and configured to be inserted into the at least one horizontal track via the pin insertion portion and configured to restrict the removable hard drive carrier to horizontal motion when the at least one pin engages with the pin retaining portion.

The hard drive carrier also includes a handle pivotably attached to the bracket and having at least one guide pin configured to be inserted into the vertical receiving groove, the handle configured to alternate between a loading position and a locked position. In the computing device, the guide pin is positioned on the handle to engage with the vertical groove to cause the at least one pin to align with the pin insertion portion when the handle is in the loading position and to engage with the vertical groove so that the at least one pin engages the pin retaining portion when the handle transitions from the loading position to the locked position.

In the computing device, the at least one drive slot can include a first locking element and the handle can include a second locking element configured for engaging the first locking element when the handle is in the locked position. The first locking element can be a hook and the second locking element can be a button configured to releasably engage with the hook.

In the computing device, the bracket can have a receiving space for receiving the hard disk drive and a plurality of protrusions extending into the receiving space and arranged to correspond with a plurality of indentations of the hard disk drive to secure the hard disk drive in the receiving space, wherein the plurality of pins include one or more movable pins and one or more fixed pins. The one or more fixed pins can extend in a vertical direction and the one or more movable pins can extend in a horizontal direction.

The computing device can further include at least one latch supporting the one or more movable pins and configured for moving the one or more movable pins in and out of the receiving space.

In the computing device, the guide pin can be offset from an axis of rotation of the handle.

DETAILED DESCRIPTION

Figure 1A:
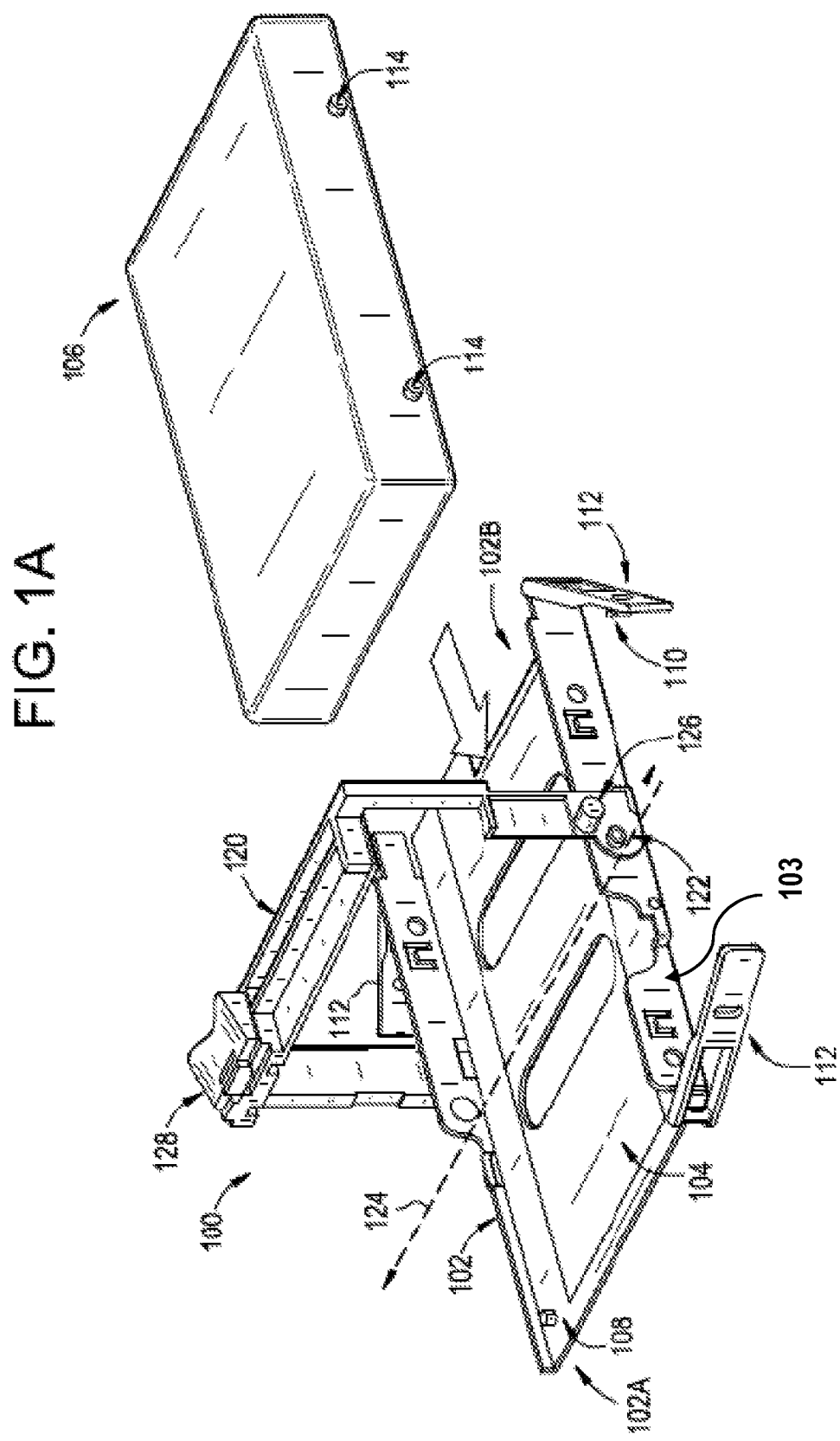
FIGS. 1A, 1B, 1C, and 1D are isometric, bottom, side, and top views of a HDD carrier according to an embodiment.

The present invention is described with reference to the attached figures, wherein like reference numerals are used throughout the figures to designate similar or equivalent elements. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

As discussed above, there is significant interest in developing means to efficiently and reliably add or remove a HDD for a computer system. In particular, there is significant interest in developing means that: (1) do not require tools to install a HDD into a computer system; (2) minimize space requirements for the HDD in the computer system; and (3) reduce or eliminate instances of incorrect installation of the HDD, which can result in damage to the HDD, the computer system, or connectors therebetween.

In view of the foregoing, the present disclosure contemplates a HDD carrier design for a computer system and computer systems therefrom that address the foregoing requirements. In particular, the present disclosure contemplates (1) a HDD carrier design that allows a technician to easily and reliably install a HDD in the HDD carrier and (2) a corresponding drive slot design for a computer system that allows mechanical and electrical installation of the HDD in the computer system with minimal effort and training on the part of the technician. Such a design is illustrated in FIGS. 1A-1D.

FIGS. 1A, 1B, 1C, and 1D are isometric, bottom, side, and top views of a HDD carrier 100 according to an embodiment. As shown in FIGS. 1A-1D, the HDD carrier 100 includes a bracket 102 with a receiving space 104 for receiving and securing a HDD 106 in a horizontal position. The bracket has sides 103 and a first end 102A and a second end 102B.

In HDD carrier 100, the HDD 106 is secured therein using a plurality of protrusions, including fixed protrusions 108 and mobile or movable protrusions 110. The fixed protrusions 108 and mobile or movable protrusions 110 are arranged in HDD carrier so that their positions correspond to openings or indentations 114 in HDD 106. For example, in the configuration illustrated in FIGS. 1A-1D, the indentations 114 are the standard threaded openings for a HDD. However, the various embodiments are not limited in this regard and the protrusions 108 and 110 can be arranged to correspond to any other features of HDD.

As noted above, the plurality of protrusions include fixed protrusions 108 and mobile or movable protrusions 110. Such a configuration is provided for ease of installation of the HDD 106 in carrier 100. In particular, the fixed protrusions 108 can be utilized for initial placement of the HDD 106 within the receiving space 104. Thereafter, the mobile protrusions 110 can be moved into place to secure the HDD 106 within bracket 102.

The mobile protrusions 110 can be implemented in a variety of ways. One exemplary configuration is illustrated in FIGS. 1A-1D. In the exemplary configuration, the mobile protrusions 110 extend horizontally from inner faces of latches 112 which are pivotably attached to the bracket 102. The latches 112 have a closed position and an open position. In the open position, the latches 112 (and the inner faces with protrusions 110) are swung away from bracket 102. In the closed position, the latches 112 are swung back towards the bracket 102 so that the inner faces of latches 112 substantially coincide with the sides 103 of bracket 102. Further, the sides 103 of bracket 102 can be configured so that the mobile protrusions extend through the sides 103 of bracket 102 and into the receiving space 104 in the closed position. To secure the latches 112 in the closed position, the latches 112 and the sides 103 of bracket 102 can have corresponding interlocking features.

It should be noted that the present disclosure contemplates that the mobile protrusions 110 can be provided using mechanisms other than a latch-type mechanism. For example, in some embodiments, a tool-less, spring-loaded mechanism can be provided to provide the mobile protrusions 110 for bracket 102. In still other embodiments, the mobile protrusions 110 can be incorporated into removable inserts that can be added or removed from the bracket 102 without the need for tools. These mechanisms are presented by way of example and not by way of limitation. Rather, the present disclosure contemplates that the mobile protrusions 110 can be provided using any other mechanisms than those discussed above. Further, the present disclosure contemplates that the mobile protrusions 110 can be provided using any combination of mechanisms. That is, different ones of mobile protrusions 110 can be provided using different mechanism.

The present disclosure also contemplates that the fixed protrusions 108 could also be provided using a mechanism that allows for removal or replacement without tools. Any of the mechanisms discussed above with respect to mobile protrusions 110 could be used for this purposes. Such a configuration can allow a single bracket to support a variety of HDD configurations or different support arrangements. For example, different HDDs could have different arrangements of indentations 114. Accordingly, the bracket 102 can be configured to allow repositioning of the fixed protrusions 108 and the mobile protrusions 110. Alternatively, it may be desirable to support different types of HDDs in different ways. That is, an HDD may be more stable or have better performance if a particular combination of indentations 114 is engaged by the fixed protrusions 108 and the mobile protrusions 110.

HDD carrier 100 further includes a handle 120. In the exemplary configuration of FIGS. 1A-1D, the handle 120 is attached to the sides 103 of bracket at pivot points 122 so as to allow the handle 120 to swing over the receiving space 104, thus defining an axis of rotation 124 for handle 120. The handle 120 can be configured to alternate between a vertical position, as shown in FIGS. 1A-1D and a horizontal position, in which the handle 120 as swung towards the first end 102A. The handle 120 also includes guide pins 126, which are offset from the axis of rotation 124. In the configuration of FIGS. 1A-1D, the handle 120 is substantially symmetric. That is, the handle 120 is attached to each side of bracket 102 via a pivot point 122 and has guide pins 126 associated with each side of bracket 102. The use and operation of handle 120 and the guide pins 126 will be discussed below in greater detail.

Figure 1B:
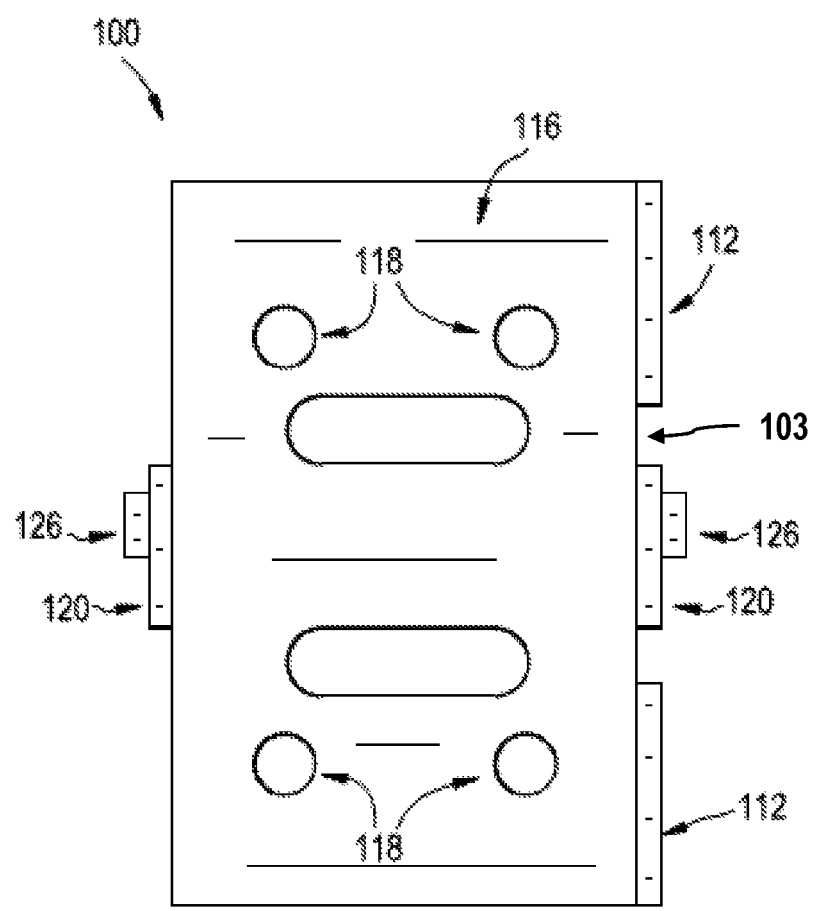
Figure 1C:
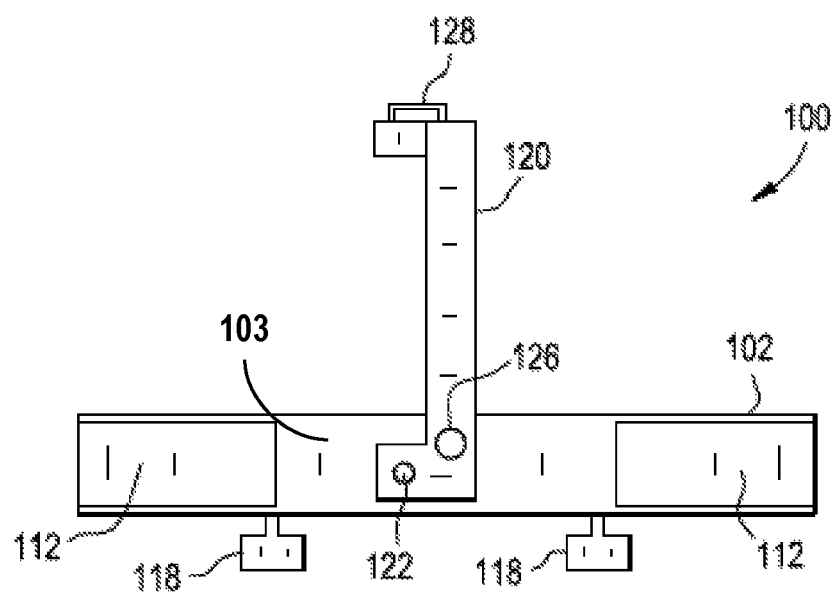
Figure 1D:
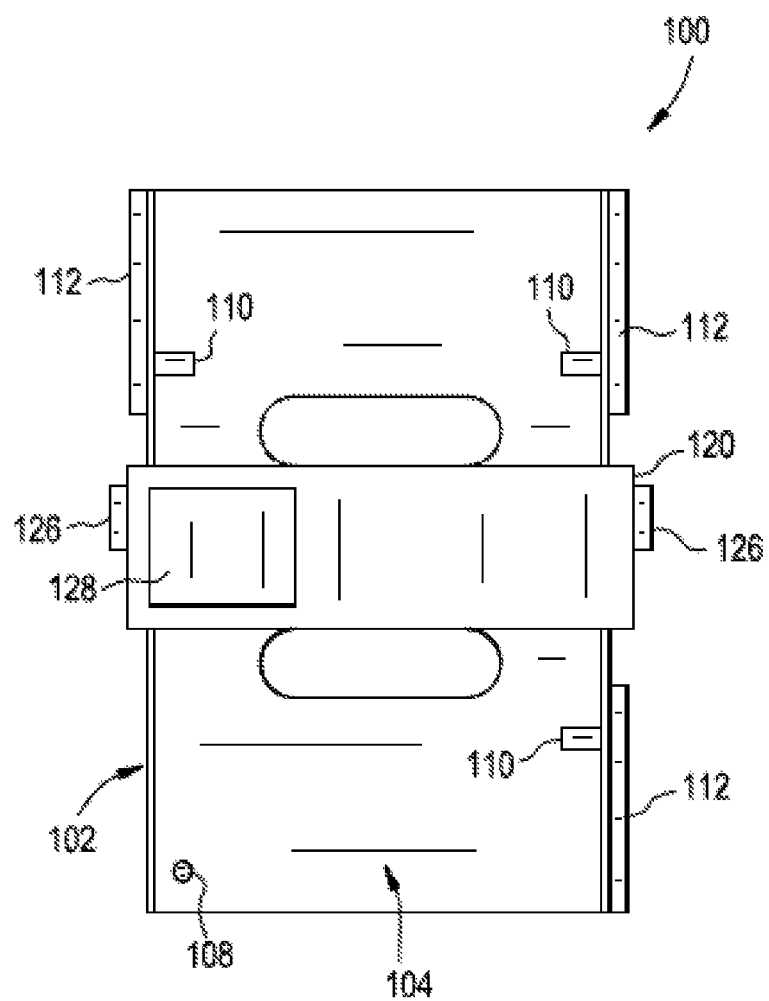

Finally, as shown in FIGS. 1A-1B, the handle 120 can include a locking element 128. In the exemplary configuration of FIGS. 1A-1B, the locking element 128 is configured as a button that engages a corresponding locking element when the handle 120 is in the horizontal position and that disengages the corresponding locking element when the button is depressed. However, the present disclosure contemplates that any other type of mechanism can be used for locking element 128. Further, although the exemplary HDD carrier 100 shows only a single locking element 128 at the top of handle 120, the present disclosure contemplates that the number and position(s) of locking elements can vary.

Figure 2:
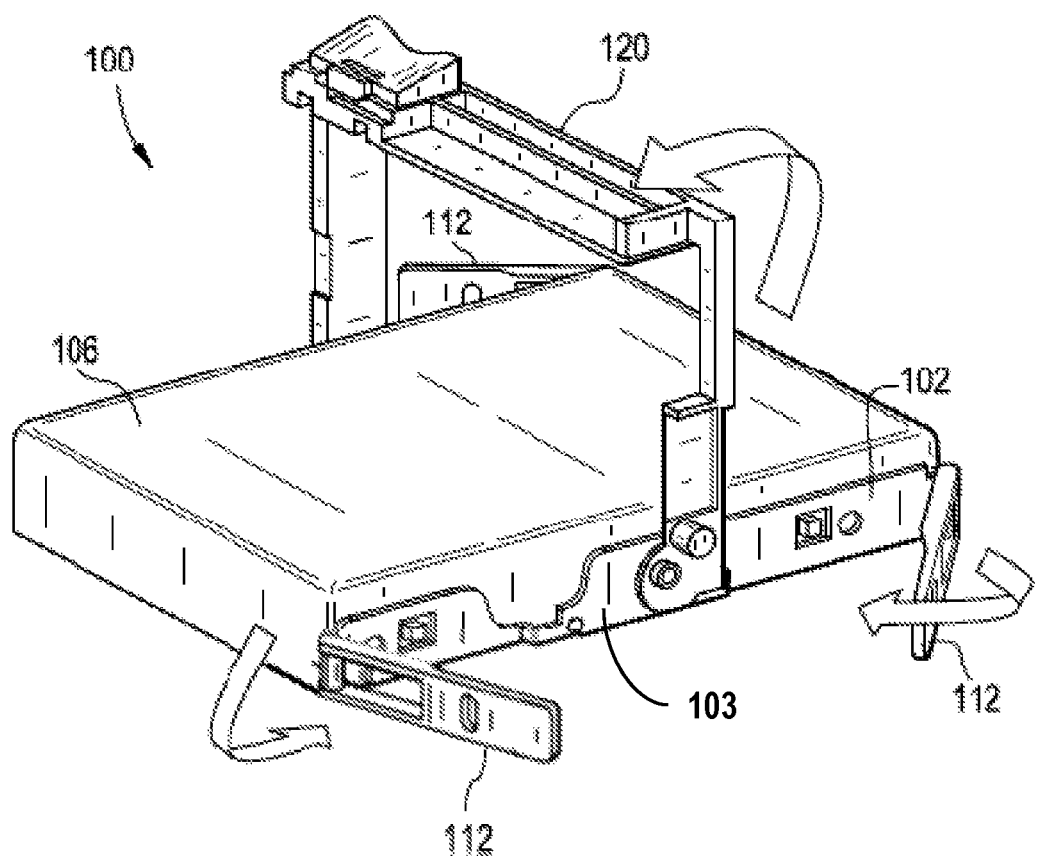
FIG. 2 shows the HDD carrier of FIG. 1 subsequent to insertion of a HDD and prior to securing the HDD in the HDD carrier.
Figure 3:
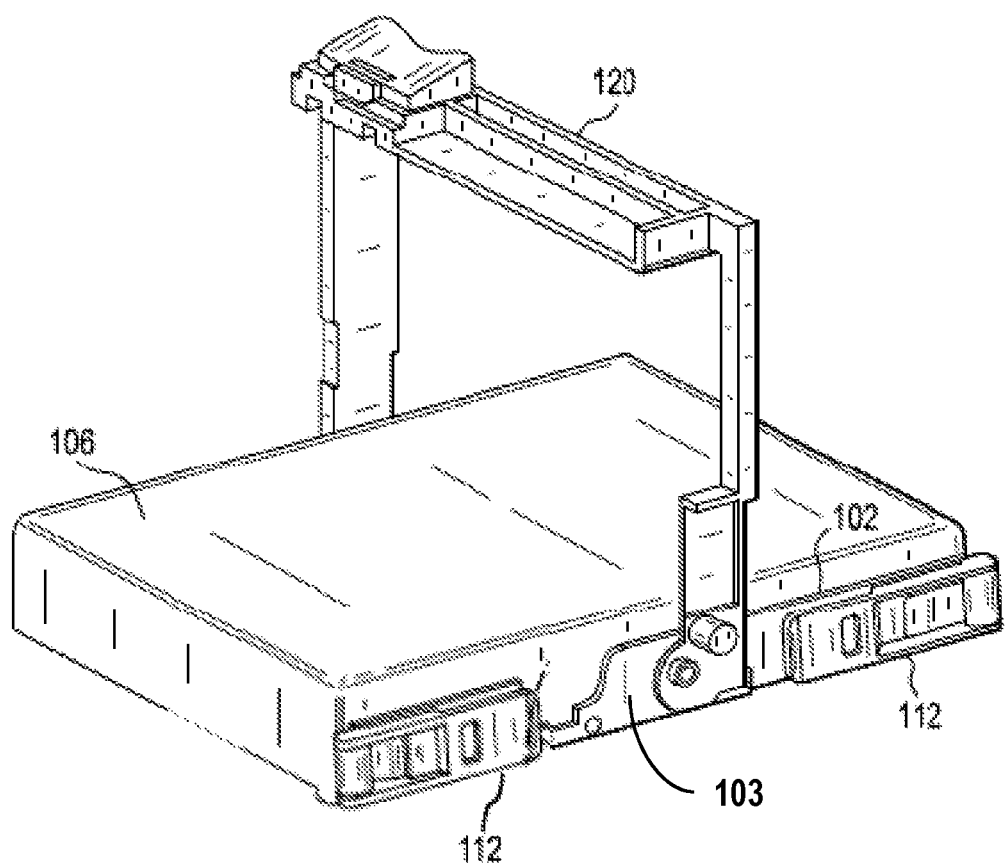
FIG. 3 shows the HDD carrier of FIG. 1 after insertion of a HDD and prior to securing the HDD in the HDD carrier.

Now turning to FIGS. 2 and 3, the operation of some aspects of the HDD carrier 100 of FIGS. 1A-1D are illustrated. FIG. 2 shows the HDD carrier of FIG. 1 subsequent to insertion of a HDD and prior to securing the HDD in the HDD carrier. FIG. 3 shows the HDD carrier of FIG. 1 prior to insertion of a HDD and prior to securing the HDD in the HDD carrier.

Referring back to FIG. 1A, a HDD 106 is inserted into the receiving space 104 while the latches 112 are not engaged with the sides 103 of bracket 102. Thus, the HDD 106 is positioned in the receiving space 104 based on the positions of any fixed protrusions 108 and the sides 103 of bracket 102. This configuration is illustrated in FIG. 2. It should be noted that although the configuration of FIG. 2 shows that the handle 120 is in the vertical position, the position of handle 120 during loading of an HDD 106 into the receiving space 104 can vary depending on the configuration of latches 112 and other components of HDD carrier 100.

Once the HDD 106 is positioned in the receiving space 104, the latches 112 can be swung inward, as shown in FIG. 2. The latches 112 can be swung inward until the latches 112 engage the sides 103 of bracket 102, at which point the mobile protrusions will be extending through the sides 103 of bracket 102 and into the corresponding indentations 114 of HDD 106. At this point, the HDD 106 is secured in HDD carrier 100.

Now that the configuration and operation of the HDD carrier 100 has been described, the disclosure now turns to a description of the configuration and operation of drive slots for receiving HDD carrier 100. This is described below with respect to FIGS. 4, 5, 6, and 7A-7C.

Figure 4:
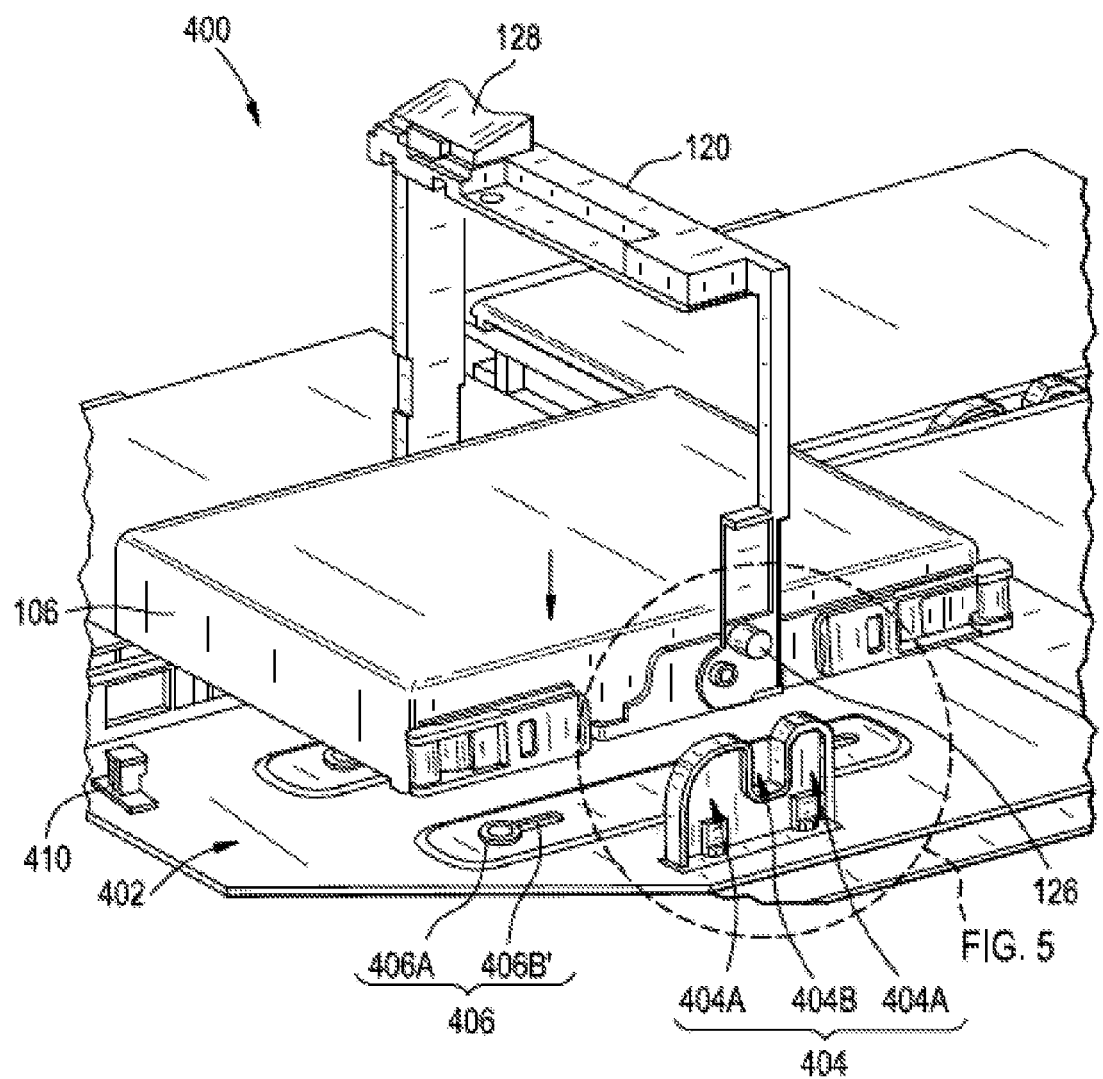
FIG. 4 shows the HDD carrier of FIG. 1 inserted into a drive slot within a chassis and configured in a loading position according to an embodiment.
Figure 5:
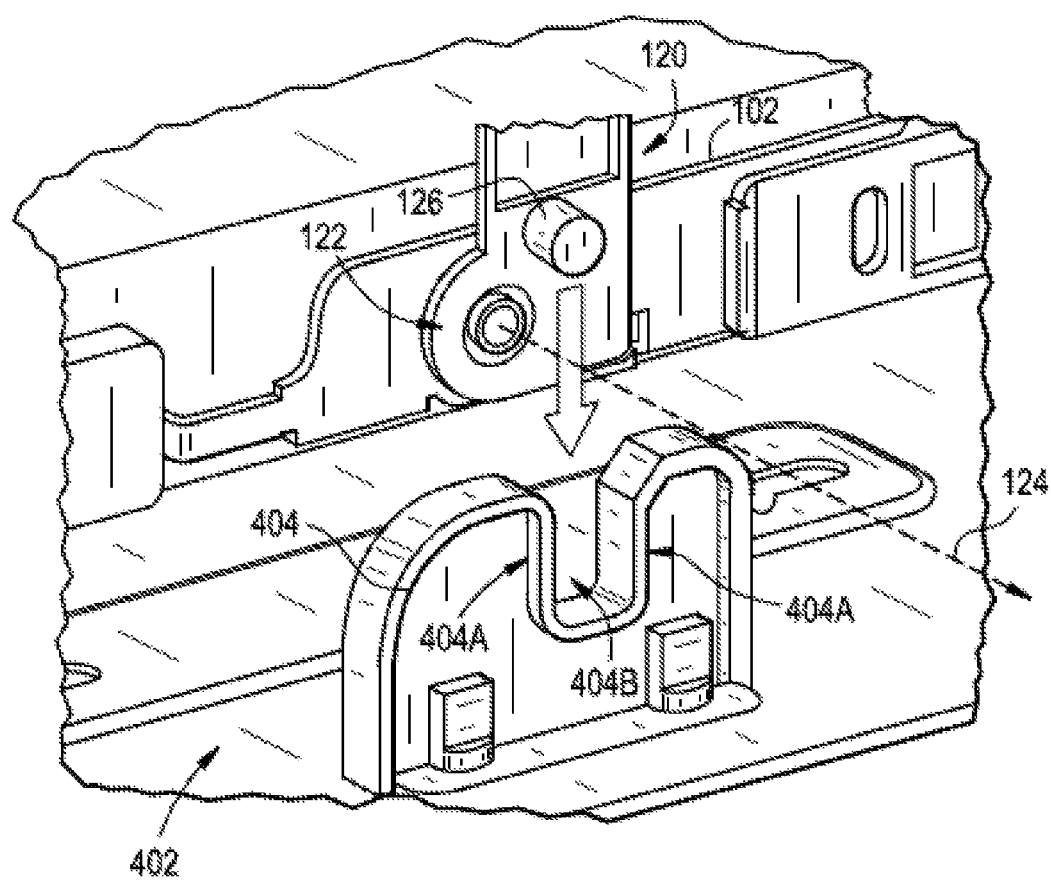
FIG. 5 is a detailed view of inset 5 of FIG. 4.

FIGS. 4 and 5 show the HDD carrier of FIG. 1 being inserted into a drive slot 402 within a chassis and configured in a loading position according to an embodiment. FIG. 5 shows a detailed view of inset 5 of FIG. 4.

The HDD carrier 100 is configured for insertion into a drive slot 402 of a computing device 400. The computing device can be a standalone computer, a server, or any other type of computing device. The drive slot 402 includes an ear 404, one or more horizontal tracks 406, a connector (not illustrated for clarity), and a locking element 410. The drive slot 402 can be disposed in a chassis or enclosure (not illustrated for clarity).

The ear 404 includes sidewalls 404A and a vertical groove 404B. The sidewalls 404A and the vertical groove 404B are positioned and arranged so that the guide pin 126 can slide into the vertical groove 404B when the handle 120 is in a vertical position. This will be described below in greater detail. However, it should be noted that the configuration of the ear 404 is not limited to that illustrated in FIGS. 4 and 5 and can be configured in other ways and provide the same functionality.

Each of the horizontal tracks 406 includes a pin insertion portion 406A and a pin retaining portion 406B. The pin insertion portion 406A and the pins 118 are arranged and sized so that pins 118 can enter the pin insertion portion 406A with a vertical motion of the HDD carrier 100. The pin retaining portion 406B and the pins 118 are arranged and sized so that after pins 118 transition into the pin insertion retaining portion 406B, the pins 118 remain in the horizontal track and retain the HDD carrier 100 in the drive slot 402 even when vertical motion of the HDD carrier 100 is attempted. The pin insertion retaining portion 406B can also be configured to allow the pins 118, thus the HDD carrier 100 to move horizontally while retaining the HDD carrier 100 in the drive slot 402.

Figure 6:
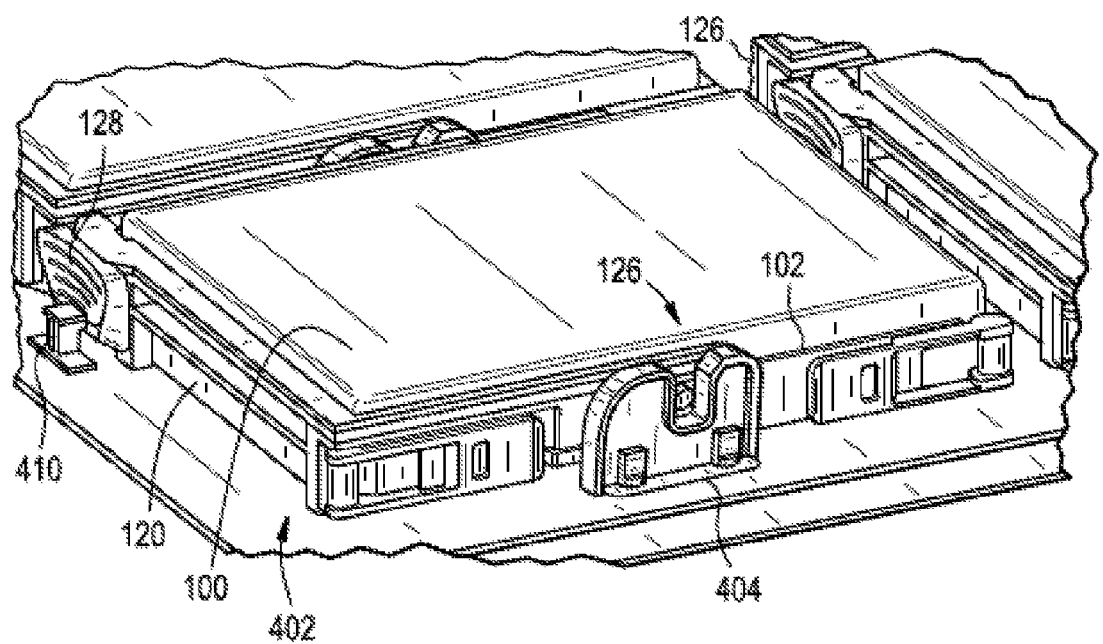
FIG. 6 shows the HDD carrier of FIG. 1 inserted into a drive slot within a chassis and configured in a locked position according to an embodiment.

FIG. 6 shows the HDD carrier 100 of FIG. 1 inserted into a drive slot 402 and configured in a locked position according to an embodiment. In the locked position, the HDD carrier 100 is configured so that the handle 120 is in a horizontal position, as illustrated in FIG. 6. As further shown in FIG. 6, the locking element 128 of the HDD carrier 100 engages with the locking element 410 of the drive slot 402. In this configuration, the interaction of the guide pin 126 and the ear 404 operates to transition the pins 118 in the pin retaining portion 406B and cause a connector of the drive slot to engage the connector of the HDD 106. This process is described in greater detail in FIGS. 7A-7C.

Figure 7A:
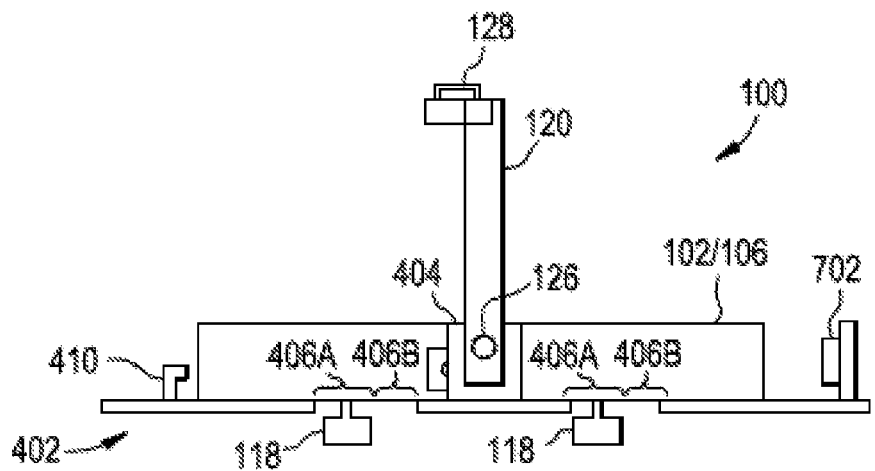
FIGS. 7A, 7B, and 7C illustrate schematically the transition of the HDD carrier of FIG. 1 from a loading position to a locked position after insertion into a drive slot within a chassis.
Figure 7B:
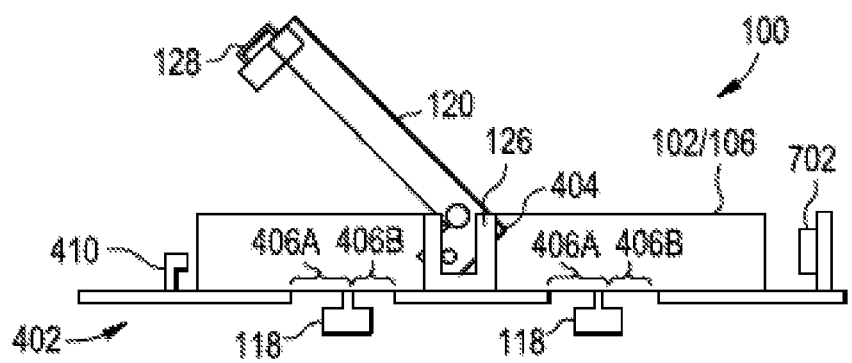
Figure 7C:
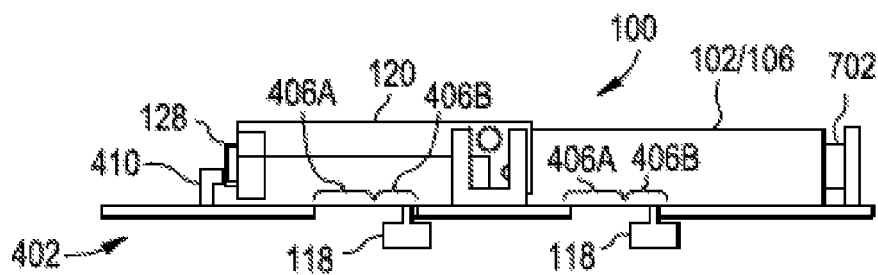

FIGS. 7A, 7B, and 7C illustrate schematically the transition of the HDD carrier 100 of FIG. 1 from a loading position to a locked position after insertion into a drive slot 402. Some reference numerals of features of the HDD carrier 100 and drive slot 402 are not provided to avoid obscuring details or to facilitate explanation and illustration. However, these features correspond to the same features of the preceding figures.

FIG. 7A illustrates the loading position. In the loading position, the handle 120 is in a vertical position, i.e., extending away from the drive slot 402. As discussed above, since the guide pin 126 is offset from the axis of rotation 124, the position of the handle 120 will cause the position of the guide pin 126 with respect to pins 118 to change. In the vertical position, the guide pin 126 is thus positioned relative to pins 118 such that when guide pin 126 is inserted into the vertical groove 406B of ear 404, the pins 118 are also aligned with the pin insertion portion 406A of corresponding ones of horizontal tracks 406 in drive slot 402. Thus, the bottom surface of bracket 102 can rest on drive slot 402 when HDD carrier 100 is inserted into the drive slot 402. In this position, no part of the HDD 106 or the HDD carrier 100 will engage the locking element 410 of the drive slot 402 or a HDD connector 702 of the drive slot 702.

FIG. 7B illustrates the operation of the HDD carrier 100 and the drive slot 402 as the handle 120 is transitioned from the vertical position to the horizontal position. As the handle 120 is rotated, the guide pin 126 will engage one of the sidewalls 404A of ear 404. Since the position of the sidewalls 404A is fixed in drive slot 402, the force applied by guide pin 126 will translate into horizontal motion of the HDD carrier 100. In particular, the force will cause, as shown in FIG. 7B, the pins 118 to first transition into the pin retaining portion 406B and, upon further moving the handle 120 towards the horizontal position, limit the HDD carrier 100 to horizontal motion since the pins will be traveling in pin retaining portion 406B. The horizontal motion of the HDD carrier will also cause the HDD carrier 100 to move towards HDD connector 702.

FIG. 7C illustrates the locked position. As the handle 120 is brought completely into the horizontal position, the guide pin 126 continues to exert force against ear 404 which causes further horizontal motion of the HDD carrier. In the exemplary configuration of FIG. 7C, the handle 120, the locking elements 128 and 410, the HDD connector 702, the HDD carrier 100, and the horizontal tracks 406 are arranged so that once the handle is in the horizontal position: (1) the locking elements 128 and 410 engage with each other to prevent motion of handle 120 (in either direction) and (2) the HDD connector 702 engages with a corresponding connector on HDD 106 so as to connect HDD 106 to the computer system associated with drive slot 402. Since at this point the HDD carrier 100 is constrained to horizontal motion, the HDD connector 702 and the corresponding connector on HDD 106 can engage safely and reliably without concern for damaging either connector.

To remove the HDD carrier 100 from drive slot, the process of FIGS. 7A-7C is reversed. First, the locking elements 128 and 410 are disengaged from each other to allow the handle 120 to be moved. Thereafter, the handle 120 is transitioned from the horizontal position to the vertical position, which causes the guide pin 126 to apply force against an opposite sidewall, which in turn causes horizontal motion of the HDD carrier 100 in an opposite direction. In this way, the horizontal motion causes the HDD connector 702 to safely disengage a corresponding connector of HDD 106. Once the handle 120 is in the vertical position, the HDD carrier can be lifted out of the drive slot 402.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The terminology used herein is for the purpose of describing particular embodiments only and is not intended to be limiting of the invention. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

What is claimed is:

1. A computing device, comprising:
    an enclosure comprising at least one drive slot, the at least one drive slot comprising at least one ear with a vertical receiving groove, at least one connector for engaging a corresponding connector of a hard disk drive, and at least one horizontal track with a pin insertion portion and a pin retaining portion; and
    a hard drive carrier for removable insertion into the at least one drive slot, the hard drive carrier comprising:
        a bracket for securing the hard disk drive and having at least one pin extending therefrom and configured to be inserted into the at least one horizontal track via the pin insertion portion and configured to restrict the removable hard drive carrier to horizontal motion when the at least one pin engages with the pin retaining portion, and
        a handle pivotably attached to the bracket and having at least one guide pin configured to be inserted into the vertical receiving groove, the handle configured to alternate between a loading position and a locked position,
    wherein the guide pin is positioned on the handle to engage with the vertical groove to cause the at least one pin to align with the pin insertion portion when the handle is in the loading position and to engage with the vertical groove so that the at least one pin engages the pin retaining portion when the handle transitions from the loading position to the locked position, wherein the at least on drive slot comprises a first locking element, and wherein the handle comprises a second locking element configured for engaging the first locking element when the handle is in the locked position.

2. The computing device of claim 1, wherein the first locking element comprises a hook, and wherein the second locking element comprises a button configured to releasably engage with the hook.

3. The computing device of claim 1, wherein the bracket comprises a receiving space for receiving the hard disk drive and a plurality of protrusions extending into the receiving space and arranged to correspond with a plurality of indentations of the hard disk drive to secure the hard disk drive in the receiving space, wherein the plurality of pins comprising one or more movable pins and one or more fixed pins.

4. The computing device of claim 3, wherein the one or more fixed pins extend in a vertical direction and the one or more movable pins extend in a horizontal direction.

5. The computing device of claim 3, further comprising at least one latch supporting the one or more movable pins and configured for moving the one or more movable pins in and out of the receiving space.

6. The computing device of claim 1, wherein the guide pin is offset from an axis of rotation of the handle.

7. A hard drive carrier for removable insertion into a drive slot having least one ear with a vertical receiving groove, at least one connector for engaging a corresponding connector of a hard disk drive, and at least one horizontal track with a pin insertion portion and a pin retaining portion, the hard drive carrier comprising:
    a bracket for securing the hard disk drive and having at least one pin extending therefrom and configured to be inserted into the at least one horizontal track via the pin insertion portion and configured to restrict the removable hard drive carrier to horizontal motion in the drive slot when the at least one pin engages with the pin retaining portion, and
    a handle pivotably attached to the bracket and having at least one guide pin configured to be inserted into the vertical receiving groove, the handle configured to alternate between a loading position and a locked position,
    wherein the guide pin is positioned on the handle to engage with the vertical groove to cause the at least one pin to align with the pin insertion portion when the handle is in the loading position and to engage with the vertical groove so that the at least one pin engages the pin retaining portion when the handle transitions from the loading position to the locked position, wherein the handle comprises a second locking element configured for engaging a first locking element of the drive slot when the handle is in the locked position.

8. The hard drive carrier of claim 7, wherein the second locking element comprises a button configured to releasably engage with the first locking element of the drive slot.

9. The hard drive carrier of claim 7, wherein the bracket comprises a receiving space for receiving the hard disk drive and a plurality of protrusions extending into the receiving space and arranged to correspond with a plurality of indentations of the hard disk drive to secure the hard disk drive in the receiving space, wherein the plurality of pins comprising one or more movable pins and one or more fixed pins.

10. The hard drive carrier of claim 9, wherein the one or more fixed pins extend in a vertical direction and the one or more movable pins extend in a horizontal direction.

11. The hard drive carrier of claim 9, further comprising at least one latch supporting the one or more movable pins and configured for moving the one or more movable pins in and out of the receiving space.

12. The hard drive carrier of claim 7, wherein the guide pin is offset from an axis of rotation of the handle.

* * * * *